United States Patent [19]

Fielding et al.

[11] B 3,925,082

[45] Dec. 9, 1975

[54] MULTICOLOR SCREEN ELEMENT CONTAINING A HYDROPHILIC COLLOID TREATED WITH A BASIC DYE AND ZIRCONIUM ACETATE

[75] Inventors: Herbert L. Fielding, Wilmington; Samuel H. Liggero, Wellesley, both of Mass.

[73] Assignee: Polaroid Corporation, Cambridge, Mass.

[22] Filed: Dec. 29, 1972

[21] Appl. No.: 319,226

[44] Published under the Trial Voluntary Protest Program on January 28, 1975 as document no. B 319,226.

[52] U.S. Cl. .................. 96/76 R; 96/80; 96/81; 96/111; 96/118
[51] Int. Cl.² ...................... G03C 1/84; G03F 5/00
[58] Field of Search .............. 96/111, 118, 76 R, 80, 96/81

[56] References Cited

UNITED STATES PATENTS

| | | | |
|---|---|---|---|
| 2,942,975 | 6/1960 | Eerde | 96/111 |
| 3,284,208 | 11/1966 | Land | 96/118 |
| 3,730,725 | 5/1973 | Idelson | 96/118 |

*Primary Examiner*—Won H. Louie, Jr.
*Attorney, Agent, or Firm*—Philip G. Kiely

[57] ABSTRACT

A method of dyeing hydrophilic colloids which comprises contacting said colloids with an aqueous solution of a dye and zirconium acetate. The zirconium acetate functions as a hardener for the colloid. The method of the present invention is particularly suitable for the preparation of additive color screens.

6 Claims, No Drawings

MULTICOLOR SCREEN ELEMENT CONTAINING A HYDROPHILIC COLLOID TREATED WITH A BASIC DYE AND ZIRCONIUM ACETATE

BACKGROUND OF THE INVENTION

This invention relates to a method of dyeing hydrophilic colloids.

It is well known in the art to dye hydrophilic colloids for a variety of purposes, for example, the preparation of colored filter elements suitable for use in photography. Such filter elements prepared from hydrophilic colloids are particularly useful in the preparation of additive color screens.

In general, color screen elements comprise a screen pattern formed of a plurality of light-transmitting colored elements which are each of an independent primary color and which are generally classifiable into different groups in accordance with the color of said elements. Thus, a conventional three-color additive screen generally has a set or group of red-colored filter elements, a set of blue-colored filter elements, and a set of green-colored filter elements. These filter elements are ordinarily in a mosaic or geometrical pattern in a random or predetermined distribution.

Color screen elements may be prepared by a variety of mechanical or photomechanical methods. A particularly suitable method of preparing color screen elements is disclosed and claimed in U.S. Pat. No. 3,284,208, issued Nov. 8, 1966 to Edwin H. Land. The aforementioned patent is directed to a process which comprises successively coating the smooth surface of a lenticular film with a plurality of photosensitive layers and sequentially subjecting the coatings to selectively displaced radiation incident on and focused by the indicated lenticules. Subsequent to each exposure, unexposed coating is removed and the remaining exposed area dyed with the appropriate dyes to provide the desired series of chromatic filter elements. U.S. Pat. No. 3,284,208 is incorporated herein by reference in its entirety.

However, a number of problems are involved in dyeing the hydrophilic colloids employed as the photosensitive layers.

Of primary importance in such a process is, of course, selection of a dye with the desired color and stability to ensure that the color will remain true substantially idefinitely, since the color screen will be in position prior to use in the film and subsequent to exposure and processing of the film. The compatability and dyeability of the dye with respect to the dyeable substrate must also be considered as well as the fastness or retention of the dye in the hydrophilic colloid since diffusion, that is, the migration of the dye from one area into an adjacent area dyed with a different color dye would result in the lack of sufficient color accuracy and intensity with respect to the area dyed, accuracy of boundaries between dyed areas, by such a diffusion or mixing of the colors of adjacent areas.

Retention of the dye in the colloid matrix is often enhanced by treating the colloid with hardeners subsequent to the dyeing step in order to "lock" the dye within the matrix, as well as prevent subsequent redyeing with another dye. However, the additional treatment of the dyeable colloid with another solution may actually leach out some of the dye in the colloid layer, decreasing the dye density in the colloid to an unacceptable level. Conventional hardeners such as zirconyl sulfate cannot be employed in the dye bath because incompatability of the dye and hardener may form a precipitate in the dye bath and the competitive rates of diffusion into the colloid matrix may result in premature hardening of the colloid layer before sufficient dye is imbibed therein thus inhibiting the dyeing of the layer to the density desired.

A novel process for dyeing has now been found which is not susceptible to the deficiencies of the prior art.

SUMMARY OF THE INVENTION

The present invention is directed to the method of dyeing hydrophilic colloids by contacting said colloid with a solution of a dye and zirconium acetate. The present invention is particularly useful for preparing additive color screen elements.

DETAILED DESCRIPTION OF THE INVENTION

In carrying out the novel process of the present invention a hydrophilic colloid is contacted with a solution of one or more dyes and zirconium acetate. Thus, by means of the present invention hardening of the colloid is achieved almost contemporaneously with the dyeing, providing a higher optical density and brilliance with more permanence and stability than would be obtained in the absence of the zirconium acetate.

Zirconium acetate may be employed satisfactorily in dye baths, particularly basic dye baths. Care should be taken in selecting a dye for employment in a dye bath of the present invention that the competitive rates of imbibition in the given substrate be such that the zirconium acetate not react with the colloid of the substrate prior to absorption of the dye by the colloid.

Zirconium acetate is present in the dye baths at a level of about 0.1 to 10.0%; more preferably 1.0%. Generally, the dye is present in a concentration range of about 0.5 to 5% by weight.

The novel system of the present invention has been found to enhance the dye affinity for the dyeable stratum, particularly if the dyeable stratum is composed of gelatin. In addition, the dyed area does not redye, that is, the almost simultaneous hardening of the colloid anchors the dye in the colloid and by increasing the cross-link density of the matrix inhibits subsequent dye diffusion into said matrix.

As stated above, the novel method of the present invention is particularly suitable for the preparation of additive multicolor screen elements.

The method of the present invention is particularly suitable for use in the method disclosed in the above-mentioned U.S. Pat. No. 3,284,208, which is incorporated herein in its entirety.

Photosensitized gelatin, i.e., potassium, sodium or ammonium dichromate sensitized gelatin is the preferred dyeable material employed in the manufacture of the additive color screens of the present invention. Other suitable materials include photosensitized albumin, casein, gum arabic, polyvinyl alcohol, and other light-sensitive polymeric materials known to the art.

The present invention will be further illustrated and detailed in conjunction with the following illustrative construction which sets out representative embodiments and photographic utilization of the novel photographic film units of this invention, which, however, are not limited to the details therein set forth and are intended to be illustrative only.

EXAMPLE

A lenticular polyester film was subjected to corona discharge and coated with a first layer of gelatin which had been sensitized by the addition of 8 weight percent potassium dichromate (based on dry gelatin). The first gelatin layer was exposed to ultraviolet radiation, in accordance with the previously detailed explanation set forth in U.S. Pat. No. 3,284,208, and the resultant photoexposed carrier subjected to the described water wash steps to provide removal of unexposed sensitized gelatin, in accordance with the exposure pattern contained in the first gelatin layer. The web was then treated with an aqueous solution of a chrome complexed phenylazopyrazalone and naphthylazopyrazalone dye as described in application Ser. No. 185,403, filed Sept. 30, 1971, now U.S. Pat. No. 3,730,725 issued May 1, 1973, rinsed in an acid-aqueous bath and then coated with a gelatin hardening agent.

The web was then rinsed, dried and a second layer of gelatin which had been sensitized by the addition of 8 weight percent potassium dichromate was coated. The second photosensitized gelatin layer was exposed to ultraviolet radiation in accordance with the previously detailed description. The second gelatin layer was then washed with water to effect removal of unexposed photosensitive gelatin, in the manner previously detailed. The remaining gelatin resist was dyed by contact with a first dyeing solution containing 1.5% Direct Green 75. 0.8% sodium acetate and 0.75 acetic acid (pH 4.3–4.6) and a second solution containing 0.25% Basic Yellow 24, 0.4% sodium acetate, 1.0% acetic acid and 1.0% zirconium acetate (pH 4.0–4.2). The web was rinsed to effect removal of any residual excess dye, dried and coated with a third layer of gelatin, sensitized with 8 weight percent potassium dichromate. The third photosensitive gelatin layer was subjected to exposure by ultraviolet radiation, in accordance with the description detailed previously. The third layer of photosensitive gelatin was washed in order to provide the desired resist formation. The resultant resist was dyed by contact with a first solution containing Direct Blue 86 and Direct Blue 87 and a second solution of Rhodamine B. A protective overcoat layer was then provided by coating the external surface of the multicolor screen element with a composition comprising 10% by weight of polyvinylidine chloride copolymer in methylethyl ketone. A diffusion transfer image-receiving layer comprising a silver-receptive stratum containing silver precipitating nuclei dispersed in a matrix of deacetylated chitin was then coated on the external surface of the protective layer, according to the practice described in U.S. Pat. No. 3,087,815, issued Apr. 30, 1963 to W. H. Ryan et al. The image-receiving layer was overcoated with a panchromatic silver iodobromide gelatin emulsion.

A comparison with an additive color screen prepared in the same manner but without the zirconium acetate showed optical density and brilliance in the screen of the present invention as well as enhanced stability.

It should be understood that while the present invention was illustrated with reference to the green elements, all the filter elements may be prepared by the novel system of the present invention.

The thus-formed additive multicolor diffusion transfer film unit was exposed to a predetermined subject and the latent image contained in the emulsion diffusion transfer processed, by contact thereof with a diffusion transfer processing composition, in accordance with the practice previously described. After an imbibition period of approximately 15 seconds the emulsion, together with the processing composition, was stripped from contact with the image-receiving layer to uncover a positive transfer print formed in the image-receiving layer. Alternatively, in accordance with the teaching set forth in U.S. Pats. Nos. 3,536,488; 3,615,427; 3,615,428; 3,615,429 and 3,615,426 the film unit may be maintained as a permanent laminate.

Projection of the resultant additive multicolor print showed satisfactory contrast, density and range.

It is desirable, of course, that the adhesion of the carrier, the three monochromatic filter layers, etc., should be very secure so that the individual structures will remain bonded during the manufacture and processing of the finished product, and further that there will be substantially no mechanical separation of the various layers which would create optical and mechanical difficulties.

Under these circumstances, it is desirable that adhesive or lacquer layers be interposed between respective layers and filter elements. The adhesive layer selected should be one which does not deleteriously interfere with the transparency of the final product, and yet provides sufficient adhesive capacity so as to allow vigorous treatment of the film unit during and subsequent to its production. The aforementioned nitrocellulose has been found to be a highly desirable bonding agent, although other adhesives known in the art for the instant purposes may be employed, where desired.

Although for photographic purposes the panchromatic emulsion layer could be applied to the rear side of the carrier, for practical purposes it is necessary to coat the emulsion on the color screen side of the carrier to provide the high color saturation.

After exposure of the above-described film, a latent image is formed in the emulsion layer and the film was processed by conventional methods without regard to the filter screen which is spaced between the carrier and the panchromatic emulsion, particularly where the filter screen is protected by a protective polymeric composition.

If a positive transparency film is desired, the image may be reversed in the conventional manner or the positive transparency film may be provided by the aforementioned diffusion transfer photographic processes.

In the description herein, each color series of filter elements has been described as covering that part of the total area in proportion to the total number of colors used, i.e., in the tri-color system, each color occupies one-third of the total area. This may vary quite widely before having a noticeable effect to the observer and, in fact, may be compensated by changing the intensity of the colors. In actual practice, if one dye is of greater intensity than the others, a deliberate compensation may be made by reducing the total relative area of the intense color. The aspect of relative areas is well known in the art so that when relative areas are used in this application, it is intended to include the variances which the art would recognize as being successful.

Lenticular films employed have comprised 320, 550, 750 and 1000 lenticules per inch and may be prepared by any of the conventional procedures well known for production of such films. The focal length of the light-modulating lenticules employed is generally in the order of about 100 u in air and, as a result of this short focal length, any object over about 1 inch from the lens surface is at infinity. As a consequence of this, maintenance of the exposure source in focus is simplified.

Specifically, a suitable polymeric film base web may be continuously contacted with a rotating embossing roller under appropriate conditions of temperature, pressure and/or solvents to provide lenticules of the shape and size desired.

Since certain changes may be made in the above processes and products without departing from the scope of the invention herein involved, it is intended that all matter contained in the above description shall be interpreted as illustrative and not in a limiting sense.

What is claimed is:

1. A photographic multicolor screen element which comprises, in combination, a geometrically repetitive plurality of chromatic filter element series; at least one of said chromatic filter element series comprising filter elements comprising a hydrophilic colloid dyed with an aqueous solution of a basic dye and zirconium acetate.

2. A product as defined in claim 1 wherein said chromatic filter elements are in substantially side-by-side relationship.

3. The product as defined in claim 2 wherein said hydrophilic colloid comprises dichromated gelatin.

4. A product as defined in claim 1 wherein said filter elements are carried on a transparent support.

5. A product as defined in claim 1 including a panchromatic photographic emulsion layer on the surface of said chromatic filter elements opposite said support.

6. A product as defined in claim 5 including a photographic diffusion transfer image-receiving layer on the surface of said chromatic filter elements opposite said support.

* * * * *